(12) United States Patent
Castle et al.

(10) Patent No.: US 7,079,008 B2
(45) Date of Patent: Jul. 18, 2006

(54) PROXIMITY TRANSACTION CONTROL METHOD

(75) Inventors: Robert John Castle, Bristol (GB); John Deryk Waters, Bath (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 383 days.

(21) Appl. No.: 10/186,848

(22) Filed: Jul. 1, 2002

(65) Prior Publication Data

US 2003/0030543 A1    Feb. 13, 2003

(30) Foreign Application Priority Data

Jul. 31, 2001    (GB)    .................................. 0118592.5

(51) Int. Cl.
*H04Q 5/22*    (2006.01)

(52) U.S. Cl. ............................... 340/10.1; 340/825.69; 340/825.72; 340/10.3; 340/10.31; 340/10.32; 340/10.4; 340/10.42; 340/539.23; 235/382; 235/382.5; 399/80; 399/81

(58) Field of Classification Search ............... 340/10.1, 340/825.49, 825.72, 825.69, 568.1, 10.3, 340/10.31, 10.32, 10.4, 10.42, 539.23; 455/41.2; 235/382, 382.5; 399/80, 81
See application file for complete search history.

(56) References Cited

U.S. PATENT DOCUMENTS 5,959,530 A * 9/1999 Lupien et al. ........... 340/568.1
6,754,468 B1 * 6/2004 Sieben et al. ............. 455/41.2
2002/0004374 A1    1/2002 Kantola et al.

FOREIGN PATENT DOCUMENTS

EP    0780802 A2    6/1997
GB    2362070 A    11/2001

* cited by examiner

*Primary Examiner*—Brian Zimmerman
*Assistant Examiner*—Vernal Brown
(74) *Attorney, Agent, or Firm*—Thomas, Kayden, Horstemeyer & Risley, LLP

(57) ABSTRACT

Embodiments enable controlling a proximity transaction between first and second communications devices, each of which is provided with a short-range transceiver. In an exemplary embodiment, the first communications device has an RF/ID reader, and the second communications device has an RF/ID tag, the RF/ID tag containing the same identifier information as the second communications device. The second communications device is positioned within the range of the reader of the first communications device. Then, the transceiver of the second communications device transmits a transaction request and the identifies information of that device to the first communications device. The reader of the first communications device then interrogates the tag of the second communications device and the transaction is completed upon the reader of the first communications device receiving identifier information from the tag of the second communications device that is identical to the identifier information already received.

21 Claims, 1 Drawing Sheet

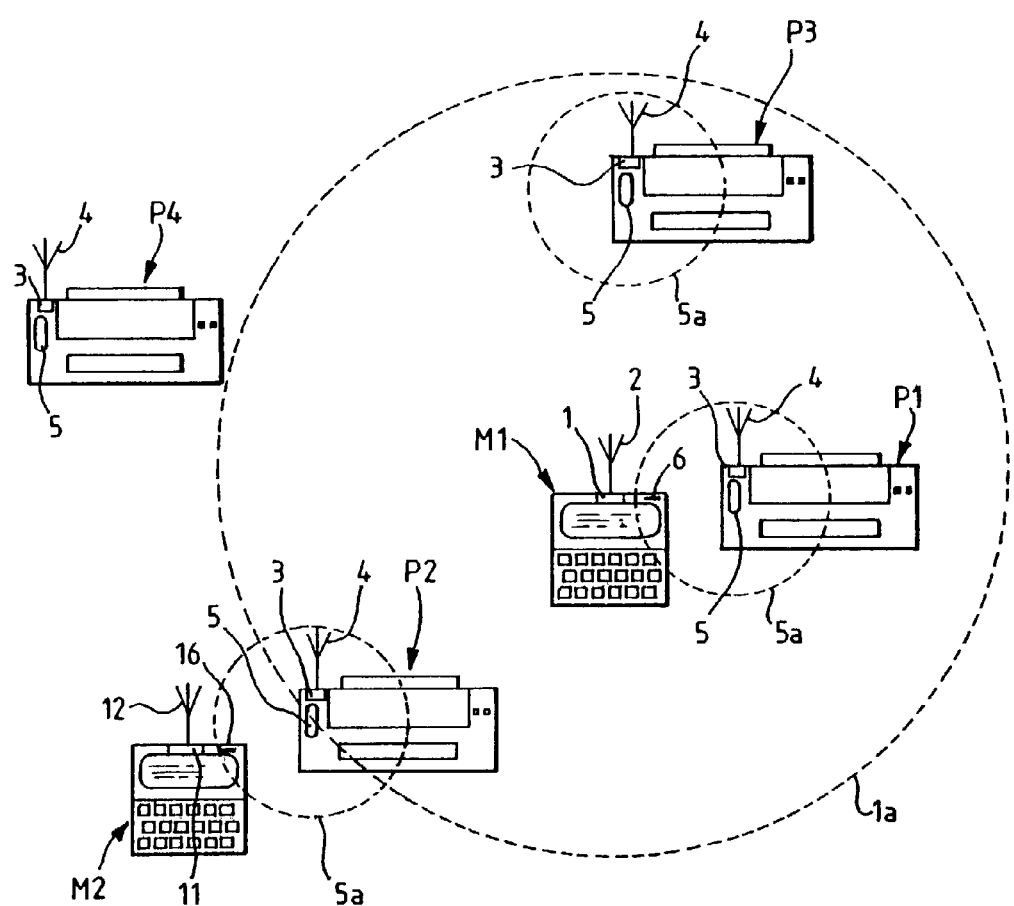

PROXIMITY TRANSACTION CONTROL METHOD

BACKGROUND TO THE INVENTION

This invention relates to a method of, and a system for, controlling a proximity transaction using short-range communications devices.

Hand-held portable and mobile devices (such as mobile phones, personal digital assistants (PDAs) and lap top computers) are often provided with a short-range high-speed wireless network interface. One such interface is the Bluetooth interface which is a short-range wireless technology which operates around 2.45 Ghz. Another known short-range wireless technology is the wireless networking technology IEEE802.11b.

When using such a device to undertake a transaction with some other device in close proximity, it is frequently the case that the range of a wireless transmission from the device is such that other devices apart from the one intended to receive the transmission, may pick up the transmission and incorrectly act upon it. For example, a user may wish to instruct a specific printer to carry out a print job using the short-range wireless network interface of a PDA. In such a case, the range of the wireless network interface may be such that printers other than that which is required to do the print job, for example another printer in the same office or down the corridor, may also receive the print request transmission, in which case the user must carry out a further printer identification step, and this may be difficult where there are several such printers.

Known ways of overcoming this problem are to use a directional infra-red link, or to use a menu system on the PDA (or other mobile device) used to send the print instructions. In the former case, the use of a directional infra-red beam makes identifying a particular receiving device less ambiguous; and, in the latter case, the menu system can correctly identify a designated receiving device from a list of possible receiving devices. Both of these solutions do, however, have the disadvantage that a conscious user effort is required, either by specifically pointing a mobile device at the required receiving device, or the navigation of a user interface and the choosing from one or more lists of options.

SUMMARY OF THE INVENTION

The aim of the invention is to provide an improved method of, and system for, controlling a proximity transaction using short-range communications devices.

The invention utilises radio frequency identification (RF/ID) technology, which is similar to bar-code technology, in that both use special readers and tags or cards attached to respective objects. The difference is that RF/ID technology uses low-power radio waves or signals thereby allowing data collection without sight of, or contact with, a tagged item.

A basic RF/ID system has three components, namely an antenna or coil, a transceiver with a decoder, and an RF/ID tag, also called a transponder, which is electronically programmed with specific information. The transceiver uses the antenna to emit radio signals to activate any in-range RF/ID tag. The transceiver can read data from such a tag, write data to that tag, or both. The antenna is the link between a tag and the transceiver, converting between radio waves and electrical signals. The transceiver controls the system data acquisition and communication. Often the antenna is packaged with the transceiver and the decoder to become an interrogator, also known as a reader.

A reader can emit radio waves with an effective range of anywhere up to 30 cm or more, depending on the unit's power output and the radio frequency used. When an RF/ID tag passes through the interrogation zone, it detects the RF activation signal, causing the tag to transmit its data. The reader receives and then decodes this data, and passes it to a host computer for processing.

The present invention provides a method of controlling a proximity transaction between first and second communications devices, each of which is provided with a short-range transceiver, the first communications device having an ID reader, and the second communications device having an ID tag, the ID tag containing the same identifier information as the second communications device, the method comprising the steps of:

a) using the transceiver of the second communications device to transmit both a transaction request and the identifier information of that device to the first communications device;

b) using the reader of the first communications device to interrogate the tag of the second communications device; and c) completing the transaction upon the reader of the first communications device receiving identifier information from the tag of the second communications device that is identical to the identifier information received in step a).

Preferably, the method further comprises the step of:

d) positioning the second communications device within the range of the reader of the first communications device.

Advantageously, step d) is carried out prior to step a).

In a preferred embodiment, the ID reader is an RF/ID reader, and the ID tag is an RF/ID tag. Preferably, the transaction request is a print request, the first communications device being a printer, and the second communications device being a mobile communications device.

The invention also provides a system for controlling a proximity transaction, the system comprising first and second communications devices, each of which is provided with a short-range transceiver, the first communications device having an ID reader, and the second communications device having an ID tag which contains identifier information identical to that of the second communications device, the system being such that the second communications device can transmit both a transaction request and the identifier information of that device to the first communications device, and subsequently the transaction can be completed upon the reader interrogating the tag of the second communications device and receiving identifier information from the tag that is identical to the identifier information already received.

In a preferred embodiment, the ID reader is an RF/ID reader, and the ID tag is an RF/ID tag.

Preferably, the first communications device is a printer, and the second communications device is a mobile communications device, such as a PDA or a mobile telephone.

Advantageously, each of the transceivers is a Bluetooth transceiver. Preferably, the range of the reader of the first communications device lies within the range of from 15 to 30 cm.

BRIEF DESCRIPTION OF THE DRAWING

The invention will now be described in greater detail, by way of example, with reference to the drawing, the single FIGURE of which is a schematic diagram illustrating a proximity method for controlling a print operation.

DESCRIPTION OF PREFERRED EMBODIMENT

Referring to the drawing, a mobile device such as a PDA M1 provided with a Bluetooth transceiver 1 is shown in the vicinity of four printers P1, P2, P3 and P4. The transceiver 1 transmit and receives short-range signals by means of an antenna 2. Each of the printers P1 to P4 is also provided with a Bluetooth transceiver 3 and with an associated antenna 4. Each printer P1 to P4 is provided with an RF/ID reader 5, the ranges (for example 15 to 30 cm) of which are indicated by the dotted lines 5a. The range (for example 10 m) of the Bluetooth transceiver of the PDA M1 is indicated by the dotted line 1a. The PDA M1 (like any network node) has a unique address (or other identifier) to identify itself to the other devices. The PDA M1 is provided with an RF/ID tag 6, and this tag contains the same address as that used to identify the PDA.

In use, it is assumed that the user of the device M1 wants to send a print job to the printer P1. The user, therefore, stands in front of the printer P1 so that the tag 6 of the PDA M1 is within range of the reader 5 of that printer. A print command is then sent by the transceiver 1 of the PDA M1, this print command being accompanied by the address of the RF/ID tag 6 of that PDA. Although the print command reaches the three printers P1 to P3 which are in range of the transceiver 1, only the printer P1 will accept the print command. This is because each printer P1 to P3 attempts to locate the RF/ID tag 6, upon reception of the print command, using its reader 5. However, the RF/ID tag 6 is within range of only the reader 5 of the printer P1. Accordingly, only the printer P1 is successful in locating an RF/ID tag (that is to say the tag 6 of the PDA M1) having the correct address to match that in the print command transmission, and so only that printer carries out the print command.

It should also be noted that, when the PDA M1 sends out its print command, the printer P4 is out of range of the transceiver 1, and so is not a problem. The two printers P2 and P3 are, however, within the range of the transceiver 1, and so potentially are capable of carrying out the print command. The drawing also shows a second PDA M2 having a Bluetooth transceiver 11, an aerial 12 and an RF/ID tag 16. The tag 16 of PDA M2 is within range of the reader 5 of the printer P2, but its tag does not match the address in the print command received by that printer from the PDA M1, so that printer does not respond.

It is not essential for the device M1 to be positioned so that its tag 6 is within range of the reader 5 of the printer P1 when the print command is sent by the transceiver 1 of that device. Thus, the print command can be sent before the tag 6 is within range of the reader 5, for example as the user carrying the device M1 approaches the printer P1. In this case, the tag 6 of the device M1 is only located by the reader 5 of the printer P1 when the tag is within range of the reader. The proximity control method is then completed when the reader 5 receives identifier information from the tag that is the same as that transmitted by the transceiver prior to the tag being in range of the reader.

It will be apparent that the proximity transaction control method described above could be modified to carry out transactions other than the control of printers. For example, the method could be adapted to control the transfer of information (such as address book information) between mobile telephones or PDAs. Here again, the RF/ID reader of one unit (the intended recipient of the information) would locate only the RF/ID tag of the unit sending the information, and any other similar unit within range of the short-range transceiver of the sending unit would not receive the information.

It will also be apparent that modifications could be made to the arrangements described above. In particular, the range of the RF/ID reader can be adapted to different circumstances. Thus, in the example where information is to be exchanged between two mobile units, the range of the RF/ID reader may be of the order of 1 to 2 metres.

The invention claimed is:

1. A method of controlling a proximity transaction between first and second communications devices, each of which is provided with a short-range transceiver, the first communications device having an ID reader, and the second communications device having identifier information specific to that device and an ID tag, the ID tag containing the same identifier information as the second communications device, the method comprising the steps of:
   a) using the transceiver of the second communications device to transmit both a transaction request and the identifier information of that device to the first communications device;
   b) using the reader of the first communications device to interrogate the tag of the second communications device; and
   c) completing the transaction upon the reader of the first communications device receiving identifier information from the tag of the second communications device that is identical to the identifier information received in step a).

2. A method as claimed in claim 1, further comprising the step of:
   d) positioning the second communications device within the range of the reader of the first communications device.

3. A method as claimed in claim 2, wherein step d) is carried out prior to step a).

4. A method as claimed in claim 1, wherein the ID reader is an RF/ID reader, and the ID tag is an RF/ID tag.

5. A method as claimed in claim 1, wherein the transaction request is a print request, the first communications device being a printer, and the second communications device being a mobile communications device.

6. A system for controlling a proximity transaction, the system comprising first and second communications devices, each of which is provided with a short-range transceiver, the first communications device having an ID reader, and the second communications device having identifier information specific to that device and an ID tag which contains identifier information identical to that of the second communications device, the system being such that the second communications device can transmit both a transaction request and the identifier information of that device to the first communications device, and subsequently the transaction is completed upon the reader interrogating the tag of the second communications device and receiving identifier information from the tag that is identical to the identifier information already received.

7. A system as claimed in claim 6, wherein the ID reader is an RF/ID reader, and the ID tag is an RF/ID lag.

8. A system as claimed in claim 6, wherein the first communications device is a printer, and the second communications device is a mobile communications device.

9. A system as claimed in claim 8, wherein the mobile communications device is a PDA.

10. A system as claimed in claim 6, wherein each of the transceivers is a Bluetooth transceiver.

11. A system as claimed in claim 6, wherein the range of the reader of the first communications device lies within the range of from 15 to 30 cm.

12. A method of controlling a print command between a mobile communications device and a printer, each of which is provided with a short-range transceiver, the printer having an RF/ID reader, and the mobile communications device having identifier information specific to that device and an RF/ID tag containing the same identifier information; the method comprising the steps of:
   a) positioning the mobile communications device within the range of the reader of the printer;
   b) using the transceiver of the mobile communications device to transmit both a print command and said identifier information to the printer;
   c) using the reader of the printer to interrogate the tag of the mobile communications device; and
   d) completing the print command upon the reader of the printer receiving identifier information from the tag of the mobile communications device that is identical to the identifier information received in step b).

13. A system for controlling a print command, the system comprising a printer and a mobile communications device, each of which is provided with a short-range transceiver, the printer having an RF/ID reader, and the mobile communications device having identified information specific to that device and an RF/ID tag which contains the same identifier information, the system being such that, with the mobile communications device within the range of the reader of the printer, the mobile communications device can transmit both a print command and the identifier information of that device to the printer, and subsequently the print command is completed upon the reader interrogating the tag of the mobile communications device and receiving identifier information from the tag that is identical to the identifier information already received.

14. A method of controlling a printer using a mobile communications device, each of which is provided with a short-range transceiver, the printer having an ID reader, and the mobile communications device having identifier information specific to that device and an ID tag, the ID lag containing the same identifier information as the mobile communications device, the method comprising the steps of:
   a) using the transceiver of the mobile communications device to transmit a print command and said identifier information to the printer;
   b) using the reader of the printer to interrogate the tag of the mobile communications device; and
   c) carrying out the print command upon the reader of the printer receiving identifier information from the tag of the mobile communications device that is identical to the identifier information received in step a), wherein the print command is received by the print station before the identifier information from the tag of the mobile communications device is received.

15. A system for controlling a printer using a mobile communications device, each of which is provided with a short-range transceiver, the printer having an ID reader, and the mobile communications device having identifier information specific to that device and an ID tag which contains the same identifier information, the system being such that the mobile communications device can transmit both a print command and said identifier information to the printer, and subsequently the print command is carried out upon the reader interrogating the tag of the mobile communications device and receiving identifier information from the tag that is identical to the identifier information already received.

16. A method of controlling a proximity transaction between a predetermined one of a plurality of first communications devices and a second communications device, each communications device being provided with a short-range transceiver, each first communications device having an ID reader, and the second communications device having identifier information specific to that device and an ID tag, the ID tag containing the same identifier information, the method comprising the steps of:
   a) using the transceiver of the second communications device to transmit both a transaction request and said identifier information;
   b) using the reader of the predetermined first communications device to interrogate the tag of the second communications device; and
   c) completing the transaction upon the reader of the predetermined first communications device receiving identifier information from the tag of the second communications device that is identical to the identifier information received in step a).

17. A system for controlling a proximity transaction between a predetermined one of a plurality of first communications devices and a second communications device, each communications device being provided with a short-range transceiver, each first communications device having an ID reader, and the second communications device having identifier information specific to that device and an ID tag containing the same identifier information, the system being such that the second communications device can transmit both a transaction request and said identifier information, and subsequently the transaction is completed upon the reader of the predetermined first communications device and receiving identifier information from the tag to the identifier information already received.

18. The method of claim 1, wherein the transaction request is transmitted within range of at least one other communications device, the at least one other communications device receiving the transaction request accompanied with the identifier information of the second communications device, the at least one other communications device configured to not respond to the transaction request without receiving the identifier information from the tag of the second communications device that is identical to the received identifier information accompanying the transaction request.

19. The system of claim 6, wherein the transaction request is transmitted within range of at least one other communications device, the at least one other communications device receiving the transaction request accompanied with the identifier information of the second communications device, the at least one other communications device configured to not respond to the transaction request without receiving the identifier information from the tag of the second communications device that is identical to the received identifier information accompanying the transaction request.

20. The system of claim 12, wherein the print command is transmitted within range of at least one other printer, the at least one other printer receiving the print command accompanied with said identifier information of the mobile communications device, the at least one other printer configured to not respond to the print command without receiving the identifier information from the tag of the mobile communications device that is identical to said received identifier information accompanying the print command.

21. The system of claim 13, wherein the print command is transmitted within range of at least one other printer having an RF/ID reader, the reader of the at least one other printer receiving the print command accompanied with the identifier information specific to the mobile communications device, the at least one other printer configured to not respond to the print command without receiving the identifier information from the RF/ID tag of the mobile communications device that is the same as the received identifier information accompanying the print command.

* * * * *